United States Patent
Bang et al.

(10) Patent No.: US 11,681,354 B2
(45) Date of Patent: Jun. 20, 2023

(54) OPERATING METHOD OF POWER OPTIMIZATION SCHEDULER AND COMPUTING APPARATUS INCLUDING POWER OPTIMIZATION SCHEDULER

(71) Applicant: Samsung Electronics Co., Ltd., Suwon-si (KR)

(72) Inventors: Byungwoo Bang, Hwaseong-si (KR); Hyung-Dal Kwon, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 37 days.

(21) Appl. No.: 17/022,584

(22) Filed: Sep. 16, 2020

(65) Prior Publication Data

US 2021/0247838 A1 Aug. 12, 2021

(30) Foreign Application Priority Data

Feb. 6, 2020 (KR) .................. 10-2020-0014030

(51) Int. Cl.
*G06F 1/32* (2019.01)
*G06F 1/3296* (2019.01)
*G06F 1/329* (2019.01)
*G06N 3/063* (2023.01)

(52) U.S. Cl.
CPC ............ *G06F 1/3296* (2013.01); *G06F 1/329* (2013.01); *G06N 3/063* (2013.01)

(58) Field of Classification Search
CPC ........ G06F 1/329; G06F 1/3296; G06N 3/063
See application file for complete search history.

(56) References Cited

U.S. PATENT DOCUMENTS

| | | | |
|---|---|---|---|
| 6,895,520 B1 * | 5/2005 | Altmejd | G06F 1/3203 713/320 |
| 8,074,093 B1 * | 12/2011 | Johnson | G06F 1/3296 713/502 |
| 8,726,055 B2 | 5/2014 | Conroy et al. | |
| 10,732,699 B2 * | 8/2020 | Pappu | G06F 1/324 |
| 2012/0072749 A1 | 3/2012 | Conroy et al. | |
| 2013/0097443 A1 * | 4/2013 | Li | G06F 1/3206 713/322 |
| 2020/0104167 A1 * | 4/2020 | Chen | G06F 11/186 |
| 2021/0224643 A1 * | 7/2021 | Li | G06N 3/08 |
| 2021/0247839 A1 * | 8/2021 | Pathak | G06F 1/3243 |

FOREIGN PATENT DOCUMENTS

| | | |
|---|---|---|
| JP | 2017-211735 A | 11/2017 |
| JP | 2018-5297 A | 1/2018 |
| KR | 10-0722314 B1 | 5/2007 |
| KR | 10-2019-0041819 A | 4/2019 |

* cited by examiner

*Primary Examiner* — Zahid Choudhury
(74) *Attorney, Agent, or Firm* — NSIP Law

(57) ABSTRACT

An operating method of a power optimization scheduler is provided, where the operating method of a power optimization scheduler includes obtaining information regarding a neural network (NN) model, determining a voltage value for a task to be performed by at least one processing device, based on the obtained information regarding the NN model, and controlling a power management device to apply a voltage corresponding to the determined voltage value to the at least one processing device.

20 Claims, 9 Drawing Sheets

OPERATING METHOD OF POWER OPTIMIZATION SCHEDULER AND COMPUTING APPARATUS INCLUDING POWER OPTIMIZATION SCHEDULER

CROSS-REFERENCE TO RELATED APPLICATIONS

This application claims the benefit under 35 USC § 119(a) of Korean Patent Application No. 10-2020-0014030, filed on Feb. 6, 2020, in the Korean Intellectual Property Office, the entire disclosure of which is incorporated herein by reference for all purposes.

BACKGROUND

Field

The following description relates to a power optimization technology.

Description of Related Art

To achieve power optimization, a dynamic voltage and frequency scaling (DVFS) table may be used. In the DVFS table, a voltage value for each frequency is selected based on a governor. Also, there is a variation in power consumption depending on an operator. For example, a difference between a voltage value required for a complex operation such as a single float precision general matrix multiplication (SGEMM) and a voltage value required for a matrix multiplication through an adder tree using a fixed point may be great.

Also, characteristics based on process variations of a device are different from each other in a shipment of a product. Such process variations may be divided into in-chip variations, on-chip variations and lot variations in the device. Sometimes power is divided according to an adaptive supply voltage (ASV)-based DVFS, and enhancement of details of power may be achieved when power consumption optimized for each device is possible.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an operating method of a power optimization scheduler, the operating method including obtaining information regarding a neural network (NN) model, determining a voltage value for a task to be performed by at least one processing device, based on the obtained information regarding the NN model, and controlling a power management device to apply a voltage corresponding to the determined voltage value to the at least one processing device.

The task may include any one or any combination of the NN model, a layer of the NN model, and an operator used in the NN model.

The determining of the voltage value may include obtaining the voltage value matching a frequency and the obtained information from a table.

The determining of the voltage value may include listing a voltage value of each of operators used in the NN model based on an order of the operators.

The determining of the voltage value may include calculating a first predicted power consumption value of the at least one processing device based on a type of the NN model, calculating a second predicted power consumption value of the at least one processing device based on a voltage value corresponding to each of layers in the NN model, calculating a third predicted power consumption value of the at least one processing device based on a voltage value corresponding to each of operators used in the NN model, and determining the voltage value based on a minimum value among the first predicted power consumption value through the third predicted power consumption value.

The operating method may include adjusting at least one of a voltage and a frequency of at least one of processing devices of the at least one processing device based on computation amounts respectively allocated to the processing devices, in response to the processing devices being assigned to perform the task.

The adjusting of the at least one of the voltage and the frequency may include adjusting a voltage and a frequency of a processing device with a smallest computation amount among the computation amounts respectively allocated to the processing devices to be less than voltages and frequencies of other processing devices.

The operating method may include calculating computation amounts that are to be respectively allocated to processing devices of the at least one processing device based on at least one of a weight matrix of the NN model and an input feature map corresponding to an input vector, in response to the processing devices being assigned to perform the task, and adjusting at least one of a voltage and a frequency of at least one of the processing devices based on the computation amounts to be respectively allocated to the processing devices.

The calculating of the computation amounts may include analyzing at least one of a position and a ratio of a first value in the weight matrix and at least one of the position and the ratio of the first value in the input feature map, and calculating the computation amounts to be respectively allocated to the processing devices, based on a result of the analyzing.

The operating method may include adding a margin to the voltage value based on a number of times the task is performed.

The operating method may include changing the margin, in response to the number of times the task being performed exceeding a threshold.

The operating method may include performing a frequency sweep and a voltage sweep, in response to an additional NN model being input, and determining a voltage value for each frequency with respect to the input additional NN model based on a result of the performing.

In another general aspect, there is provided a computing apparatus including at least one processing device, and a power optimization scheduler configured to obtain information regarding a neural network (NN) model, to determine a voltage value for a task to be performed by the at least one processing device, based on the obtained information regarding the NN model, and to control a power management device to apply a voltage corresponding to the determined voltage value to the at least one processing device.

The task may include any one or any combination of the NN model, a layer of the NN model and an operator used in the NN model.

The power optimization scheduler is further configured to obtain the voltage value matching a frequency and the obtained information from a table.

The power optimization scheduler is further configured to list a voltage value of each of operators used in the NN model based on an order of the operators.

The power optimization scheduler is further configured to calculate a first predicted power consumption value of the at least one processing device based on a type of the NN model, calculate a second predicted power consumption value of the at least one processing device based on a voltage value corresponding to each of layers in the NN model, calculate a third predicted power consumption value of the at least one processing device based on a voltage value corresponding to each of operators used in the NN model, and determine the voltage value based on a minimum value among the first predicted power consumption value through the third predicted power consumption value.

The power optimization scheduler is further configured to adjust at least one of a voltage and a frequency of at least one of processing devices of the at least one processing device based on computation amounts respectively allocated to the processing devices, in response to the processing devices being assigned to perform the task.

The power optimization scheduler is further configured to calculate computation amounts that are to be respectively allocated to processing devices of the at least one processing device based on at least one of a weight matrix of the NN model and an input feature map corresponding to an input vector, in response to the processing devices being assigned to perform the task, and adjust at least one of a voltage and a frequency of at least one of the processing devices based on the computation amounts to be respectively allocated to the processing devices.

The power optimization scheduler is further configured to analyze at least one of a position and a ratio of a first value in the weight matrix and at least one of the position and the ratio of the first value in the input feature map, and calculate the computation amounts to be respectively allocated to the processing devices, based on a result of the analyzing.

Other features and aspects will be apparent from the following detailed description, the drawings, and the claims.

Figure 1:
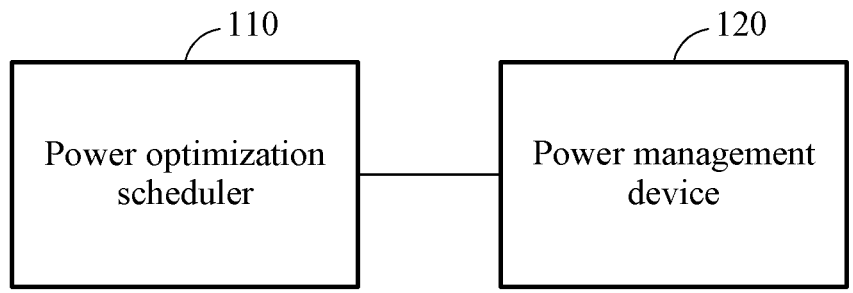
FIG. 1 illustrates an example of a power optimization scheduler.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

The terminology used herein is for the purpose of describing particular examples only and is not to be limiting of the examples. As used herein, the singular forms are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

When describing the examples with reference to the accompanying drawings, like reference numerals refer to like constituent elements and a repeated description related thereto will be omitted. In the description of examples, detailed description of well-known related structures or functions will be omitted when it is deemed that such description may be redundant.

Hereinafter, examples will be described in detail with reference to the accompanying drawings, and like reference numerals in the drawings refer to like elements throughout.

FIG. 1 illustrates an example of a power optimization scheduler 110.

Referring to FIG. 1, the power optimization scheduler 110 controls a power management device 120 or a power management module. The power management device 120 includes a power management integrated circuit (PMIC) located outside a chip, or a power management unit (PMU) located in the chip. Depending on an implementation, the power optimization scheduler 110 may be applied to the PMU or a clock management unit (CMU) located in the chip. Depending on another implementation, the power optimization scheduler 110 may be implemented by a single function of the power management device 120.

The power optimization scheduler 110 may be expressed as a power optimization module or a power optimization device.

The power optimization scheduler 110 controls the power management device 120 to supply optimal power to at least one piece of hardware. Hardware may include, for example, but is not limited to, a processing device or a memory. The processing device may include, for example, but is not limited to, a central processing unit (CPU), a graphics processing unit (GPU), a neural processing unit (NPU), a controller and an arithmetic logic unit (ALU), a DSP, a microcomputer, an FPGA, a programmable logic unit (PLU), or any other device capable of responding to and executing instructions in a defined manner. The processing device may be expressed as a processing unit or a processing module.

In an example, the power optimization scheduler 110 obtains information about a neural network (NN) model, and determines a voltage value or a low supply voltage Low Vcc, LVcc for a task that is to be performed in hardware, based on the obtained information. The information about the NN model may include, for example, any one or any combination of a type of the NN model, a type of a layer of the NN model and a type of an operator used in the NN model. The task may include, for example, any one or any combination of the NN model, a layer of the NN model and an operator used in the NN model. In an example, the power optimization scheduler 110 may determine a voltage value that matches a frequency or a clock frequency and the type of the NN model, which will be described below with reference to FIG. 2. In another example, the power optimization scheduler 110 may determine a voltage value that matches a frequency and the type of the layer of the NN model, which will be described below with reference to FIG. 3. In still another example, the power optimization scheduler 110 may determine a voltage value that matches a frequency and the type of the operator of the NN model, which will be described below with reference to FIGS. 4A and 4B.

The power optimization scheduler 110 controls the power management device 120 based on the determined voltage value. By a control of the power optimization scheduler 110, the power management device 120 applies a voltage corresponding to the determined voltage value to at least one piece of hardware that is to perform a task. Thus, the power optimization scheduler 110 allows optimal power to be supplied to at least one piece of hardware that is to perform an NN model. For example, power consumption may be optimized during a computation of the NN model.

FIGS. 2, 3, 4A and 4B illustrate examples of an operation of the power optimization scheduler 110.

Figure 2:
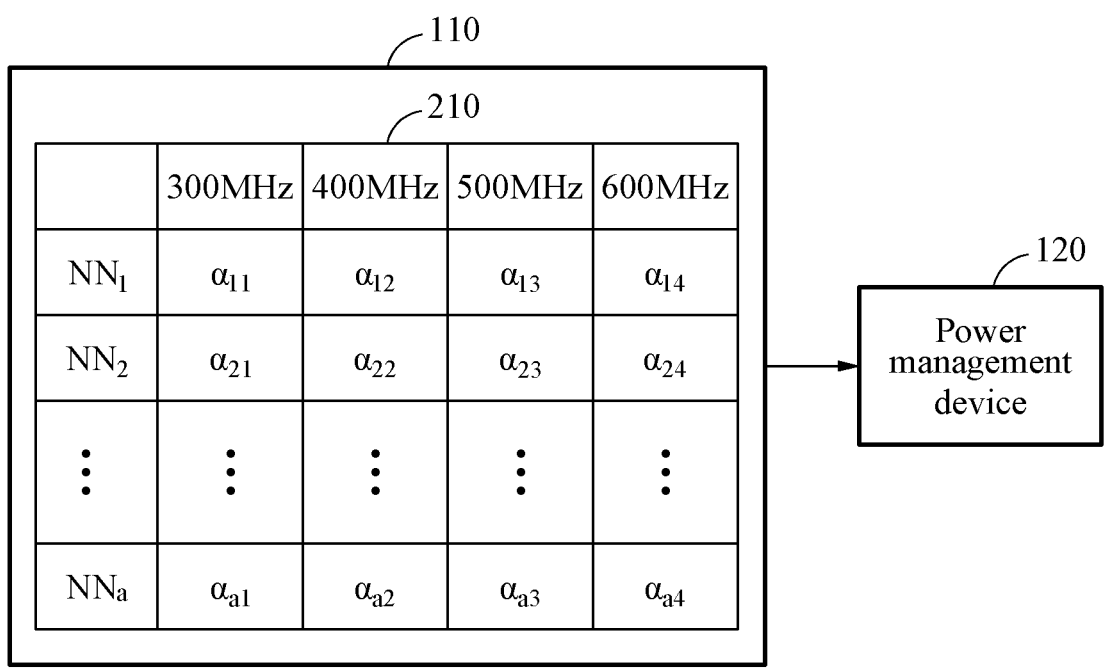
FIGS. 2, 3, 4A and 4B illustrate examples of an operation of a power optimization scheduler.

Referring to FIG. 2, the power optimization scheduler 110 stores a table 210. In the table 210, a voltage value matching a frequency and a type of an NN model is recorded. Depending on an implementation, a power value, instead of a voltage value, may be recorded in the table 210.

In the table 210, $NN_1$ through $NN_a$ each represent a type of an NN model. The power optimization scheduler 110 searches for a voltage value matching a frequency and a type of an NN model based on the table 210, and controls the power management device 120 based on the found voltage value.

For example, in the example of FIG. 2, when an NN model is loaded, the power optimization scheduler 110 may obtain a frequency and information about a type of the NN model. In the example of FIG. 2, when the type of the loaded NN model is $NN_1$ and when a frequency of a processing device in which the NN model is to be performed is 300 megahertz (MHz), the power optimization scheduler 110 may obtain or retrieve a voltage value of $\alpha_{11}$ matching $NN_1$ and 300 MHz from the table 210. The power optimization scheduler 110 may control the power management device 120 based on the voltage value of $\alpha_{11}$. The power management device 120 may apply a voltage corresponding to the voltage value of $\alpha_{11}$ to at least one processing device that is to perform the loaded NN model.

In an example, the power optimization scheduler 110 calculates a number of times the NN model is performed, and updates the table 210 in consideration of aging based on the number of times the NN model is performed. Table updating may be performed periodically or performed when an NN model is performed or by other necessities. When a table is periodically updated, a period thereof may be set as a register. For example, when a number of times an NN model $NN_1$ is performed exceeds a number of times, the power optimization scheduler 110 may add a margin to a voltage value corresponding to each frequency of the NN model $NN_1$. Also, the power optimization scheduler 110 may reflect a delta value to the margin every time the number of times the NN model $NN_1$ is performed exceeds a threshold. Thus, a speed of degradation of at least one processing device that performs an NN model may be minimized. Also, a value changed due to the degradation may be reflected in the margin, and thus a power optimization may be possible. For example, when the number of times the NN model of $NN_1$ is performed exceeds a number of times and reaches a first threshold, the power optimization scheduler 110 may add a first delta value to the margin. In this example, when the number of times the NN model $NN_1$ is performed exceeds the first threshold and reaches a second threshold, the power optimization scheduler 110 may add the first delta value to a value obtained by "margin+first delta value".

Figure 3:
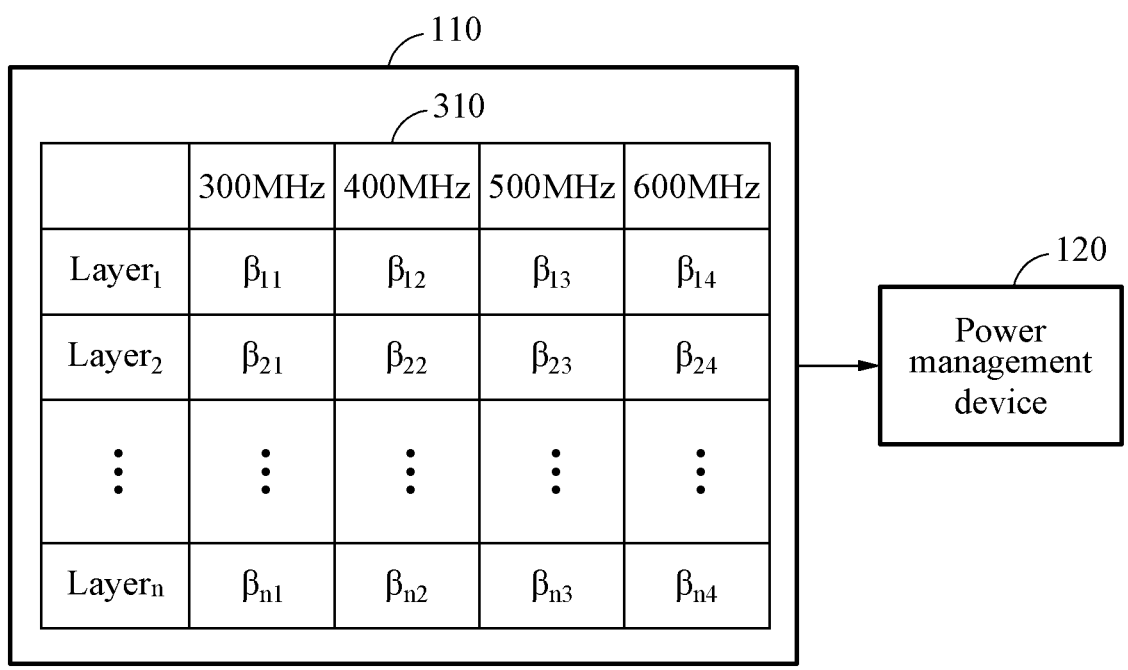

Referring to FIG. 3, the power optimization scheduler 110 stores a table 310. In the table 310, a voltage value matching a frequency and a type of layers are recorded. Depending on an implementation, a power value, instead of a voltage value, may be recorded in the table 310.

In the table 310, $Layer_1$ through $Layer_n$ each represent a type of a layer. For example, $Layer_1$ may represent a convolution layer, $Layer_2$ may represent a fully connected layer, and $Layer_n$ may represent a max pooling layer, but examples are not limited thereto. The power optimization scheduler 110 searches for a voltage value matching a frequency and a type of a layer in an NN model based on the table 310 and controls the power management device 120 based on the found voltage value.

In the example of FIG. 3, when an NN model is loaded, the power optimization scheduler 110 may obtain a frequency and information about a type of a layer in the loaded NN model. In the example of FIG. 3, when the type of the layer in the loaded NN model is Layer$_2$ and a frequency of a processing device in which the layer is to be performed is 400 MHz, the power optimization scheduler 110 may obtain or retrieve a voltage value of $\beta_{22}$ matching layer$_2$ and 400 MHz from the table 310. The power optimization scheduler 110 may control the power management device 120 based on the voltage value of $\beta_{22}$. The power management device 120 may apply a voltage corresponding to the voltage value of $\beta_{22}$ to at least one processing device that is to perform the layer, Layer$_2$.

The power optimization scheduler 110 performs the operation described above with reference to FIG. 3 every time the type of layers changes.

In an example, the power optimization scheduler 110 calculates a number of times a layer is performed, and updates the table 310 in consideration of aging based on the number of times the layer is performed. For example, when a number of times a layer Layer$_1$ is performed exceeds a number of times, the power optimization scheduler 110 may add a margin to a voltage value corresponding to each frequency of the layer Layer$_1$. Also, the power optimization scheduler 110 may reflect a delta value to the margin every time the number of times the layer Layer$_1$ is performed exceeds a threshold. Thus, a speed of degradation of at least one processing device may be minimized.

Figure 4A:
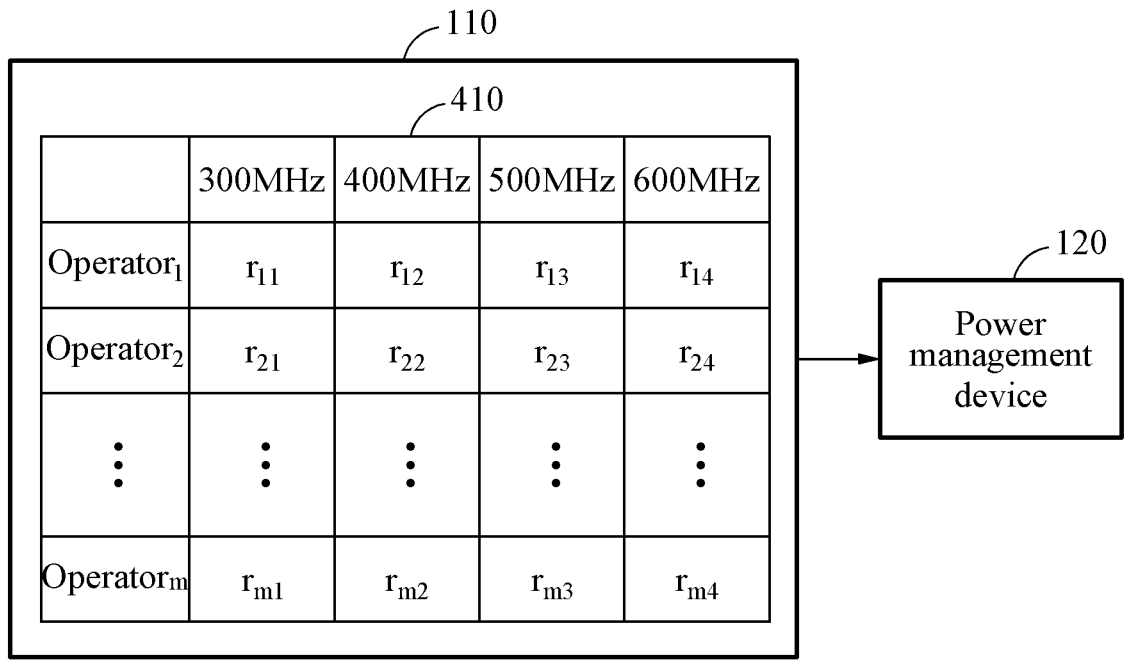
Figure 4B:
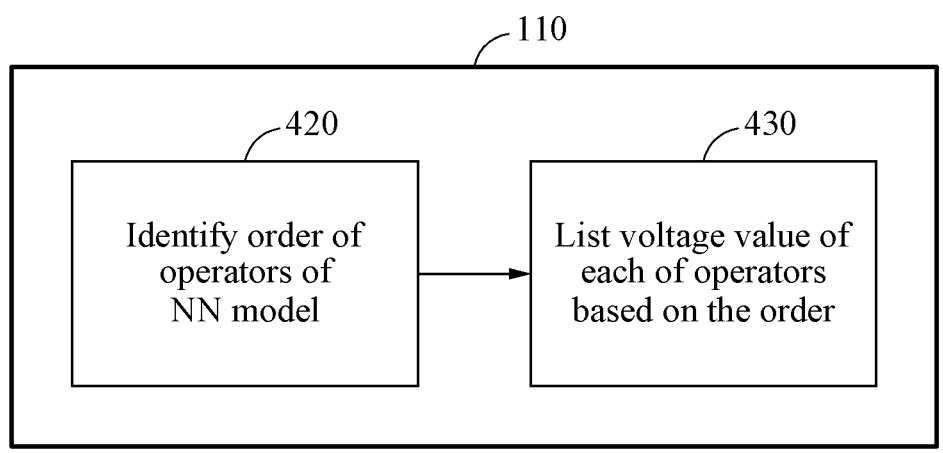

Referring to FIG. 4A, the power optimization scheduler 110 stores a table 410. In the table 410, a voltage value matching a frequency and a type of operators is recorded. Depending on an implementation, a power value, instead of a voltage value, may be recorded in the table 410.

In the table 410, Operator$_1$ through Operator$_m$ each represent a type of an operator. For example, Operator$_1$ may represent a convolution operator and Operator$_m$ may represent a max pooling operator, but examples are not limited thereto. The power optimization scheduler 110 searches for a voltage value matching a frequency and a type of an operator used in an NN model based on the table 410 and controls the power management device 120 based on the found voltage value.

In the example of FIG. 4A, when an NN model is loaded, the power optimization scheduler 110 may obtain a frequency and information about a type of an operator used in the loaded NN model. In the example of FIG. 4A, when a type of an operator is Operator$_m$ and a frequency is 500 MHz, the power optimization scheduler 110 may obtain or retrieve a voltage value of $r_{m3}$ matching Operator$_m$ and 500 MHz from the table 410. The power optimization scheduler 110 may control the power management device 120 based on the voltage value of $r_{m3}$. The power management device 120 may provide power corresponding to the voltage value of $r_{m3}$ to at least one processing device that is to perform the operator Operator$_m$.

Depending on an implementation, the power optimization scheduler 110 may generate a list by recognizing voltage values used for operators used in a loaded NN model and may control the power management device 120 based on a queue. Thus, the power optimization scheduler 110 may not reference the table 410 every time an operator changes, and may control the power management device 120 based on a voltage value stored in the queue. For example, referring to FIG. 4B, when an NN model is loaded, the power optimization scheduler 110 may identify an order of operators of the loaded NN model in operation 420, and may list a voltage value of each of the operators in operation 430. For example, operators Operator$_1$, Operator$_2$ and Operator$_m$ may be used in the loaded NN model and a frequency may be 300 MHz. In this example, the operator Operator$_2$ may be assumed to be used first and the operator Operator$_m$ may be assumed to be used last. The power optimization scheduler 110 may list a voltage value of each of the operators in an order of use of the operators Operator$_1$, Operator$_2$ and Operator$_m$, based on the table 410. Table 1 shows an example of a list based on the listing.

TABLE 1

| Operator$_2$ | $r_{21}$ |
|---|---|
| Operator$_1$ | $r_{11}$ |
| Operator$_m$ | $r_{m1}$ |

When an operation corresponding to the operator Operator$_2$ is performed by at least one processing device, the power optimization scheduler 110 may retrieve $r_{21}$ from the queue and may control the power management device 120 based on $r_{21}$. When an operation corresponding to the operator Operator$_1$ is performed by at least one processing device, the power optimization scheduler 110 may retrieve $r_{11}$ from the queue and may control the power management device 120 based on $r_{11}$. When an operation corresponding to the operator Operator$_m$ is performed by at least one processing device, the power optimization scheduler 110 may retrieve $r_{m1}$ from the queue and may control the power management device 120 based on $r_{m1}$. Thus, the power optimization scheduler 110 may control the power management device 120 at a high speed, to achieve a power optimization.

The power optimization scheduler 110 may perform the operation described above with reference to FIG. 4A or 4B every time the type of operators changes.

In an example, the power optimization scheduler 110 calculates a number of times an operator is performed, and updates the table 410 in consideration of aging based on the number of times the operator is performed. For example, when a number of times the operator Operator$_1$ is performed exceeds a number of times, the power optimization scheduler 110 may add a margin to a voltage value corresponding to each frequency of the operator Operator$_1$. Also, the power optimization scheduler 110 may reflect a delta value to the margin every time the number of times the operator Operator$_1$ is performed exceeds a threshold. Thus, a speed of degradation may be minimized.

Figure 5:
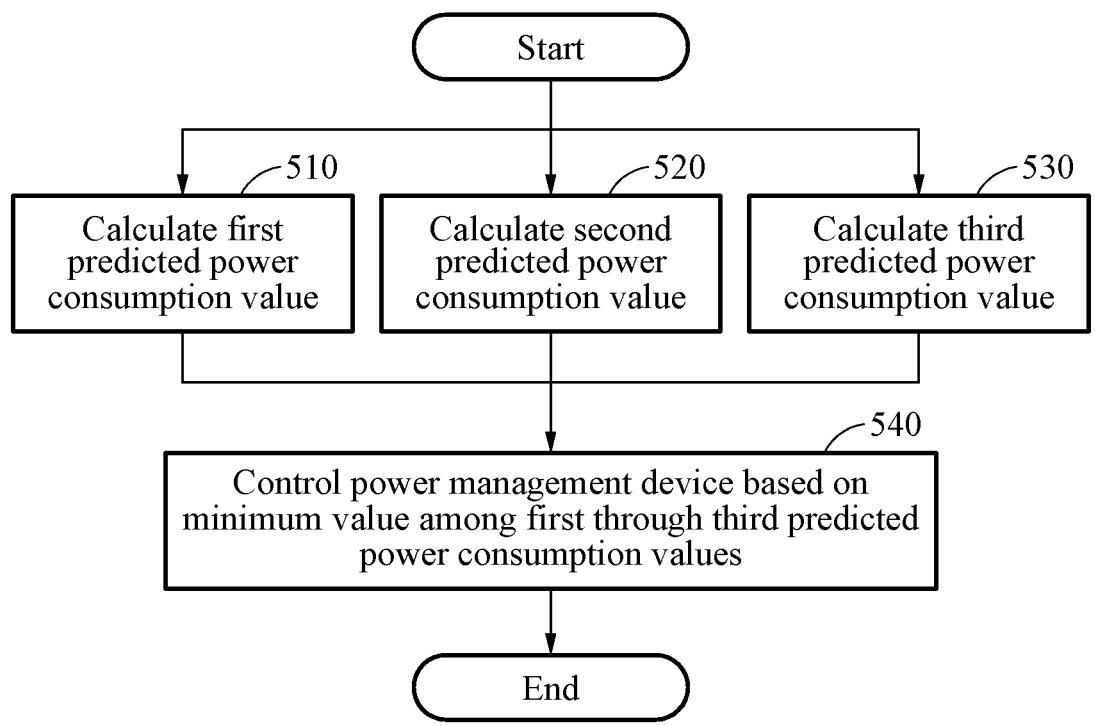
FIG. 5 is a diagram illustrating another example of an operation of a power optimization scheduler.

FIG. 5 is a diagram illustrating another example of an operation of the power optimization scheduler 110. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer, such as a processor, that perform the specified functions, or combinations of special purpose hardware and computer instructions. In addition to the description of FIG. 5 below, the descriptions of FIGS. 1-4 are also applicable to FIG. 5, and are incorporated herein by reference. Thus, the above description may not be repeated here.

Referring to FIG. 5, the power optimization scheduler 110 calculates a first predicted power consumption value in operation 510, calculates a second predicted power consumption value in operation 520, and calculates a third predicted power consumption value in operation 530.

For example, when an NN model is loaded, the power optimization scheduler 110 may select at least one processing device among a plurality of processing devices. In this example, the selected processing device may be a processing device that is to perform the NN model.

The power optimization scheduler 110 may calculate a first predicted power consumption value of the selected processing device based on a frequency and a type of the loaded NN model. For example, the power optimization scheduler 110 may retrieve a voltage value matching the frequency and the type of the loaded NN model from the table 210 of FIG. 2. In an example, the power optimization scheduler 110 may calculate the first predicted power consumption value based on equation $P=C \times f \times V^2$ in which f denotes a frequency, V denotes a retrieved voltage value and C denotes a constant.

The power optimization scheduler 110 may calculate a second predicted power consumption value of the selected processing device based on a frequency and a type of each of layers in the loaded NN model. For example, the power optimization scheduler 110 may retrieve a voltage value matching the frequency and the type of the layers in the loaded NN model from the table 310 of FIG. 3. When the loaded NN model includes layers $Layer_1$ and $Layer_n$, and when the frequency is 400 MHz, the power optimization scheduler 110 may retrieve $\beta_{12}$ and $\beta_{n2}$ from the table 310. The power optimization scheduler 110 may calculate a predicted power consumption value of each of the layers $Layer_1$ and $Layer_n$ based on equation $P=C \times f \times V^2$, and may calculate the second predicted power consumption value by adding the predicted power consumption values of the layers $Layer_1$ and $Layer_n$.

The power optimization scheduler 110 may calculate a third predicted power consumption value of the selected processing device based on a frequency and a type of each of operators used in the loaded NN model. For example, the power optimization scheduler 110 may retrieve a voltage value matching the frequency and the type of the operators used in the loaded NN model from the table 410 of FIG. 4. When operators $Operator_1$ and $Operator_m$ are used in the loaded NN model and when the frequency is 400 MHz, the power optimization scheduler 110 may retrieve $r_{12}$ and $r_{m2}$ from the table 410. The power optimization scheduler 110 may calculate a predicted power consumption value of each of the operators $Operator_1$ and $Operator_m$ based on equation $P=C \times f \times V^2$, and may calculate the third predicted power consumption value by adding the predicted power consumption values of the operators $Operator_1$ and $Operator_m$.

In operation 540, the power optimization scheduler 110 controls the power management device 120 based on a minimum value among the first predicted power consumption value through the third predicted power consumption value. For example, when the third predicted power consumption value is the minimum value, the power optimization scheduler 110 may control the power management device 120 based on $r_{12}$ in response to the operator $Operator_1$ being used, and may control the power management device 120 based on $r_{m2}$ in response to the operator $Operator_m$ being used. When an operation corresponding to the operator $Operator_1$ is performed, the power management device 120 may apply a voltage corresponding to $r_{12}$ to the selected processing device. When an operation corresponding to the operator $Operator_m$ is performed, the power management device 120 may apply a voltage corresponding to $r_{m2}$ to the selected processing device. Thus, a power optimization may be achieved.

Figure 6:
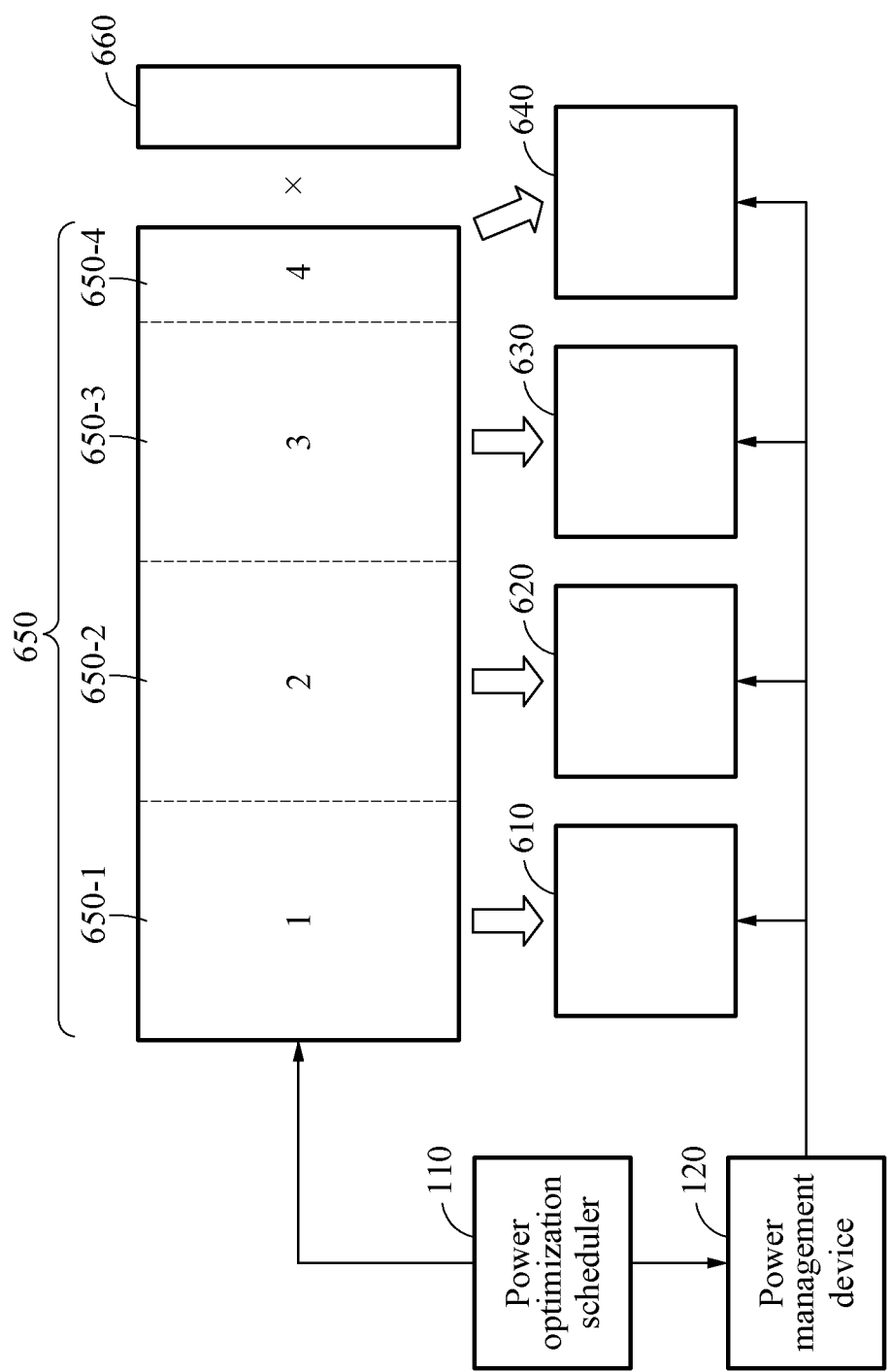
FIGS. 6, 7 and 8 illustrate other examples of an operation of a power optimization scheduler.
Figure 7:
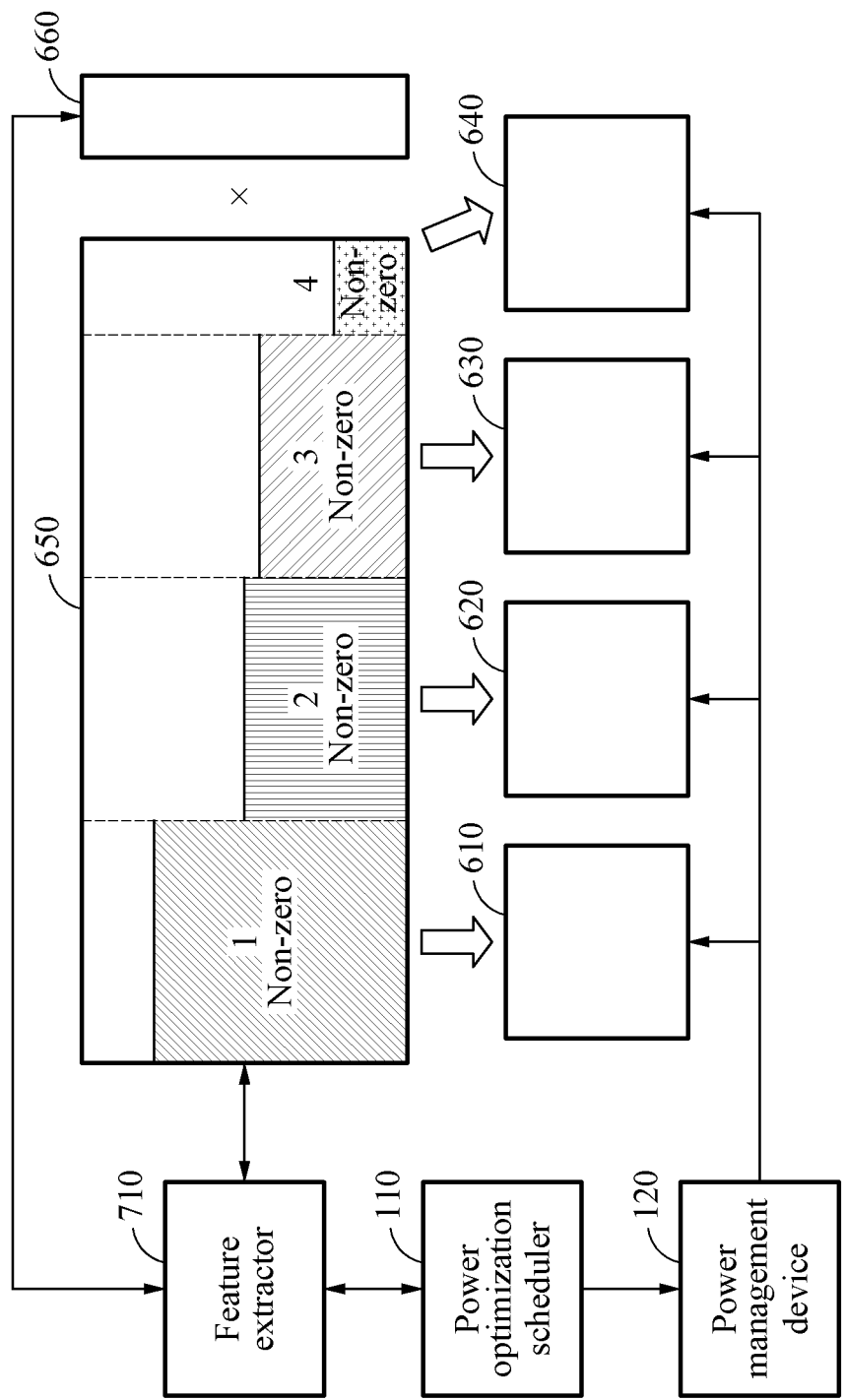
Figure 8:
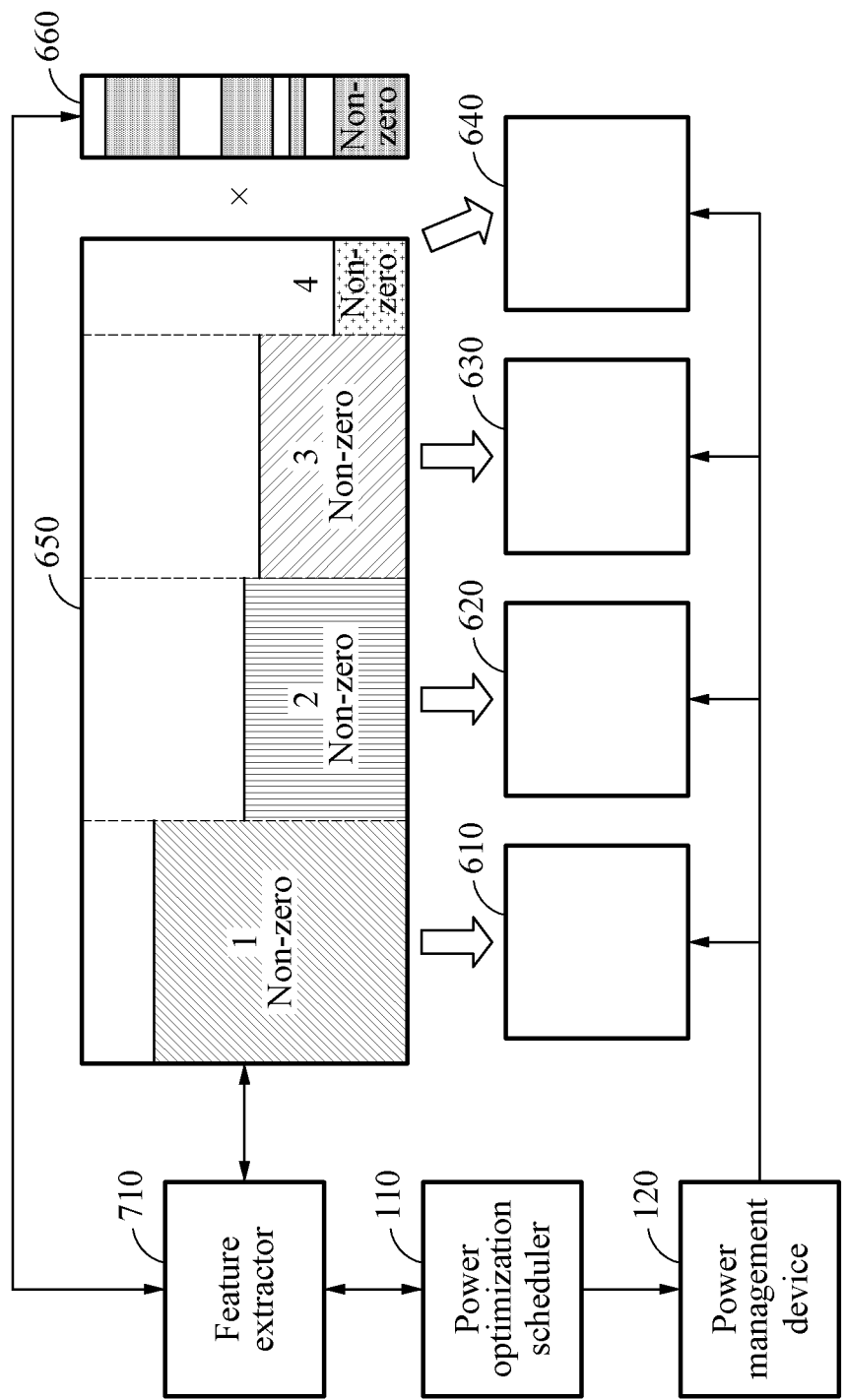

FIGS. 6, 7 and 8 illustrate other examples of an operation of the power optimization scheduler 110.

For example, a plurality of processing devices may perform a task. In this example, the power optimization scheduler 110 may adjust a voltage and/or frequency of at least one of the processing devices based on a computation amount of each of the processing devices. Each of the processing devices may correspond to, for example, but is not limited to, an operation unit, a multiply accumulator (MAC) array, or an NPU. The processing devices will be further described below with reference to FIGS. 6 through 8.

Referring to FIG. 6, the power optimization scheduler 110 calculates a computation amount to be allocated to each of the processing devices 610 through 640. For example, the power optimization scheduler 110 may calculate a computation amount to be assigned to each of the processing devices 610 through 640, based on a size of a weight matrix 650 and a number of MACs included in each of the processing devices 610 through 640. As shown in the example of FIG. 6, the power optimization scheduler 110 may estimate a total computation amount based on the size of the weight matrix 650 (or the size of the weight matrix 650 and a size of an input vector 660). The power optimization scheduler 110 may allocate a computation amount corresponding to a first sub-matrix 650-1 of the weight matrix 650 (or a computation amount corresponding to a matrix multiplication between the first sub-matrix 650-1 of the weight matrix 650 and the input vector 660) to the processing device 610, based on a number of MACs included in the processing device 610. Also, the power optimization scheduler 110 may allocate a computation amount corresponding to a second sub-matrix 650-2 of the weight matrix 650 (or a computation amount corresponding to a matrix multiplication between the second sub-matrix 650-2 of the weight matrix 650 and the input vector 660) to the processing device 620, based on a number of MACs included in the processing device 620. Furthermore, the power optimization scheduler 110 may allocate a computation amount corresponding to a third sub-matrix 650-3 of the weight matrix 650 (or a computation amount corresponding to a matrix multiplication between the third sub-matrix 650-3 of the weight matrix 650 and the input vector 660) to the processing device 630, based on a number of MACs included in the processing device 630. In addition, the power optimization scheduler 110 may allocate the other computation amount, that is, a computation amount corresponding to a fourth sub-matrix 650-4 of the weight matrix 650 (or a computation amount corresponding to a matrix multiplication between the fourth sub-matrix 650-4 of the weight matrix 650 and the input vector 660) to the processing device 640.

In the example of FIG. 6, the computation amount allocated to the processing device 640 is less than a computation amount allocated to each of the other processing devices, i.e., the processing devices 610 through 630. In this example, the power optimization scheduler 110 may adjust at least one of a voltage and a frequency of the processing device 640. For example, the power optimization scheduler 110 may control the power management device 120 to apply a voltage less than a voltage applied to each of the processing devices 610 through 630 to the processing device 640, and/or may adjust the frequency of the processing device 640 to be low. In this example, the power optimization scheduler 110 may adjust at least one of the voltage and the frequency of the processing device 640, to prevent an operation of the processing device 640 from being terminated later than those of the processing devices 610 through 630. Thus, a total operation speed may not greatly change even when the processing device 640 slowly performs an operation until operations of the processing devices 610 through 630 are terminated. However, at least one of the voltage and the frequency of the processing device 640 may be adjusted to be low, so that power consumption by the processing device 640 may be reduced, thereby enabling low-power driving.

Because an amount of work of an NN model including the weight matrix 650 and a method of performing the NN model are defined in advance, there is little difference in a computation amount even though any data is input to the NN model. Thus, power used to perform the NN model may be almost static. Therefore, when power or voltages are defined for each NN model, power may be saved.

In an example, the power optimization scheduler 110 may further use at least one of a position and a number (or a ratio) of zeros in the weight matrix 650, to calculate a computation amount to be allocated to each of the processing devices 610 through 640. Referring to FIG. 7, a feature extractor 710 may analyze at least one of the position and the number (or the ratio) of zeros in the weight matrix 650. The power optimization scheduler 110 may calculate a computation amount to be allocated to each of the processing devices 610 through 640, based on an analysis result of the feature extractor 710, the size of the weight matrix 650 and the number of MACs included in each of the processing devices 610 through 640.

The feature extractor 710 may be separated from the power optimization scheduler 110 or included in the power optimization scheduler 110.

As shown in the example of FIG. 7, the power optimization scheduler 110 may estimate the total computation amount based on at least one of the position and the number (or the ratio) of zeros in the weight matrix 650 (or the input vector 660 and at least one of the position and the number (or the ratio) of zeros in the weight matrix 650). The power optimization scheduler 110 may allocate a computation amount corresponding to a non-zero portion of the first sub-matrix 650-1 of the weight matrix 650 (or a computation amount corresponding to a matrix multiplication between the input vector 660 and the non-zero portion of the first sub-matrix 650-1 of the weight matrix 650) to the processing device 610, based on the number of MACs included in the processing device 610. Also, the power optimization scheduler 110 may allocate a computation amount corresponding to a non-zero portion of the second sub-matrix 650-2 of the weight matrix 650 (or a computation amount corresponding to a matrix multiplication between the input vector 660 and the non-zero portion of the second sub-matrix 650-2 of the weight matrix 650) to the processing device 620, based on the number of MACs included in the processing device 620. Furthermore, the power optimization scheduler 110 may allocate a computation amount corresponding to a non-zero portion of the third sub-matrix 650-3 of the weight matrix 650 (or a computation amount corresponding to a matrix multiplication between the input vector 660 and the non-zero portion of the third sub-matrix 650-3 of the weight matrix 650) to the processing device 630, based on the number of MACs included in the processing device 630. In addition, the power optimization scheduler 110 may allocate the other computation amount, i.e., a computation amount corresponding to a non-zero portion of the fourth sub-matrix 650-4 of the weight matrix 650 (or a computation amount corresponding to a matrix multiplication between the input vector 660 and the non-zero portion of the fourth sub-matrix 650-4 of the weight matrix 650) to the processing device 640.

In an example, the power optimization scheduler 110 may further use an input feature map corresponding to the input vector 660, to calculate a computation amount to be allocated to each of the processing devices 610 through 640. Referring to FIG. 8, the feature extractor 710 may analyze at least one of the position and the ratio (or the number) of zeros in the weight matrix 650, and may generate the input feature map corresponding to the input vector 660. The input feature map may include at least one of a position and a ratio (or a number) of zeros of the input vector 660. The power optimization scheduler 110 may calculate a computation amount to be allocated to each of the processing devices 610 through 640, based on the input feature map, the size of the weight matrix 650, at least one of the position and the ratio (or the number) of zeros in the weight matrix 650, and the number of MACs included in each of the processing devices 610 through 640.

As shown in the example of FIG. 8, the power optimization scheduler 110 may allocate a computation amount corresponding to a matrix multiplication between the non-zero portion of the first sub-matrix 650-1 of the weight matrix 650 and a non-zero portion of the input vector 660 to the processing device 610, and may allocate a computation amount corresponding to a matrix multiplication between the non-zero portion of the second sub-matrix 650-2 of the weight matrix 650 and the non-zero portion of the input vector 660 to the processing device 620. Also, the power optimization scheduler 110 may allocate a computation amount corresponding to a matrix multiplication between the non-zero portion of the third sub-matrix 650-3 of the weight matrix 650 and the non-zero portion of the input vector 660 to the processing device 630. The power optimization scheduler 110 may allocate the other computation amount, i.e., a computation amount corresponding to a matrix multiplication between the non-zero portion of the fourth sub-matrix 650-4 of the weight matrix 650 and the non-zero portion of the input vector 660 to the processing device 640. Depending on examples, any value other than "0" may be used to distinguish non-zero values from zeros. For example, the feature extractor 710 may determine values that are less than or equal to a threshold in each of the first sub-matrix 650-1 through the fourth sub-matrix 650-4 of the weight matrix 650 to be a zero portion, and may determine the other values to be the non-zero portion. Similarly, the feature extractor 710 may determine values that are less than or equal to a predetermined value in the input vector 660 to be a zero portion and may determine the other values to be the non-zero portion. A block that controls an NPU may include a register configured to adjust a value, that is, a threshold, used to distinguish non-zero values from zeros.

In the examples of FIGS. 7 and 8, a largest computation amount is allocated to the processing device 610. In this example, the power optimization scheduler 110 may lower at least one of a voltage and a frequency of each of the other processing devices, that is, the processing devices 620 through 640. For example, the power optimization scheduler 110 may control the power management device 120 such that a voltage less than a voltage applied to the processing device 610 may be applied to the processing devices 620 through 640, and/or may adjust a frequency of each of the processing devices 620 through 640 to be less than a frequency of the processing device 610. Thus, low-power driving may be achieved.

Although not shown in FIGS. 7 and 8, the power optimization scheduler 110 may calculate a computation amount to be allocated to each of the processing devices 610 through 640, based on the input feature map. For example, the power optimization scheduler 110 may allocate a computation amount corresponding to a multiplication between the first sub-matrix 650-1 of the weight matrix 650 and the non-zero portion of the input vector 660 to the processing device 610, and may allocate a computation amount corresponding to a multiplication between the second sub-matrix 650-2 of the weight matrix 650 and the non-zero portion of the input vector 660 to the processing device 620. Also, the power optimization scheduler 110 may allocate a computation amount corresponding to a multiplication between the third sub-matrix 650-3 of the weight matrix 650 and the non-zero portion of the input vector 660 to the processing device 630, and may allocate a computation amount corresponding to a multiplication between the fourth sub-matrix 650-4 of the weight matrix 650 and the non-zero portion of the input vector 660 to the processing device 640.

An amount of work of an NN model and a method of performing the NN model may vary depending on an input, for example, the input vector 660, by a technology, for example, zero-skipping. Thus, power or voltages used for an operation may be dynamic based on the input. For example, when a zero distribution (or a zero ratio) of the input is identified, the power optimization scheduler 110 may save power by performing power optimization for each NN model, for each layer or for each operator.

Figure 9:
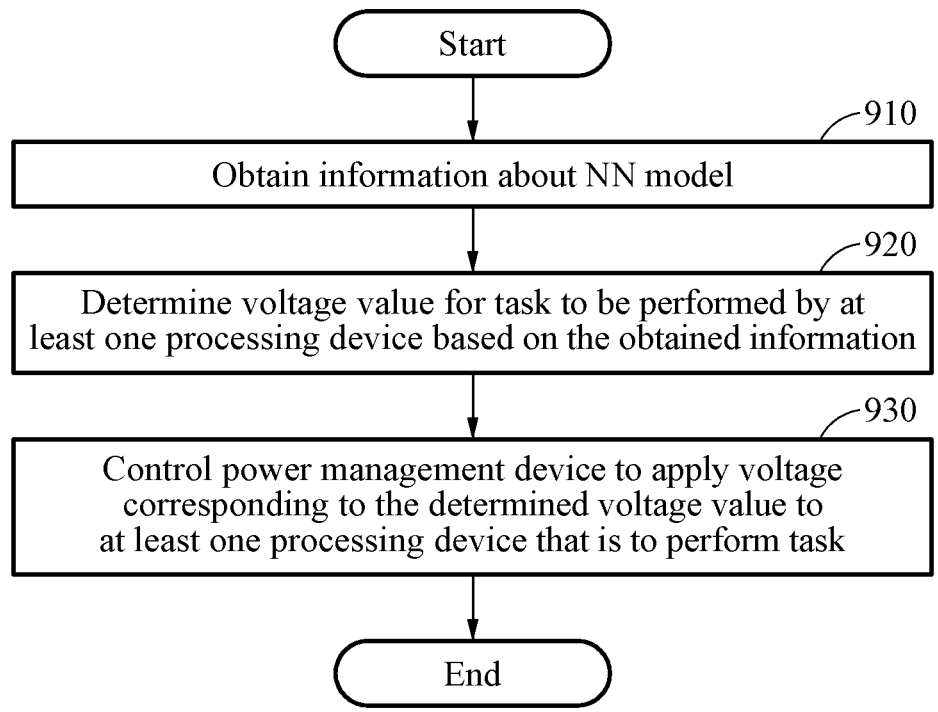
FIG. 9 is a diagram illustrating an example of an operating method of a power optimization scheduler.

FIG. 9 is a diagram illustrating an example of an operating method of a power optimization scheduler. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently. One or more blocks of FIG. 9, and combinations of the blocks, can be implemented by special purpose hardware-based computer, such as a processor, that perform the specified functions, or combinations of special purpose hardware and computer instructions. In addition to the description of FIG. 9 below, the descriptions of FIGS. 1-8 are also applicable to FIG. 9, and are incorporated herein by reference. Thus, the above description may not be repeated here.

Referring to FIG. 9, in operation 910, the power optimization scheduler 110 obtains information about an NN model.

In operation 920, the power optimization scheduler 110 determines a voltage value for a task that is to be performed by at least one processing device, based on the obtained information. As in the example of FIG. 2, the power optimization scheduler 110 may obtain a voltage value that matches a type of an NN model to be performed by at least one processing device and that matches a clock frequency of the at least one processing device from table 210. As in the example of FIG. 3, the power optimization scheduler 110 may obtain a voltage value that matches a type of a layer to be performed by at least one processing device and that matches a clock frequency of the at least one processing device from table 310. As in the example of FIG. 4A, the power optimization scheduler 110 may obtain a voltage value that matches a type of an operator to be performed by at least one processing device and that matches a clock frequency of the at least one processing device from table 410. Also, as in the example of FIG. 4B, the power optimization scheduler 110 may generate a list by listing voltage values of operators based on the order of the operators and may store the list in a queue. The power optimization scheduler 110 may obtain a voltage value from the queue every time an operator changes.

In operation 930, the power optimization scheduler 110 controls the power management device 120 to apply a voltage corresponding to the determined voltage value to at least one processing device that is to perform a task.

In an example, a plurality of processing devices may be assigned to perform an NN model. In this example, the power optimization scheduler 110 may adjust at least one of a voltage and a frequency of at least one of the processing units based on a computation amount to be allocated to each of the processing devices. As in the example of FIG. 6, the power optimization scheduler 110 may adjust a voltage and a frequency of a processing device to which a smallest computation amount is to be allocated among the processing devices to be less than voltages and frequencies of the other processing devices.

In an example, when processing devices are assigned to perform an NN model, the power optimization scheduler 110 may calculate a computation amount to be allocated to each of the processing devices, based on at least one of the weight matrix 650 of the NN model and the input feature map corresponding to the input vector 660. For example, the power optimization scheduler 110 may analyze at least one of a ratio (or a position) of a first value in the weight matrix 650 and a ratio (or a position) of a first value the input feature map, and may calculate a computation amount to be allocated to each of the processing devices based on a result of the analysis. The first value may be, for example, a zero. The calculating of the computation amounts has been described above with reference to FIGS. 7 and 8, and accordingly further description thereof is not repeated herein. The power optimization scheduler 110 may adjust at least one of a voltage and a frequency of at least one of the processing units based on a computation amount to be allocated to each of the processing devices. For example, as in the examples of FIGS. 7 and 8, the power optimization scheduler 110 may adjust voltages and frequencies of processing devices other than a processing device to which a largest computation amount is to be allocated to be low.

In an example, the power optimization scheduler 110 may add a margin to a voltage value for a task, based on a number of times the task is performed. In an example, when the number of times the task is performed exceeds a threshold, the power optimization scheduler 110 may change the margin. For example, when a number of times an NN model is performed exceeds a number of times, the power optimization scheduler 110 may add a margin to a voltage value for the NN model. In this example, when the number of times the NN model is performed exceeds the number of times and exceeds a threshold, the power optimization scheduler 110 may change the margin by applying a delta value to the margin.

Depending on examples, the power optimization scheduler 110 may be applied to a neural model accelerator. Also, the power optimization scheduler 110 may optimize power consumption when NPUs are computed in parallel.

Figure 10:
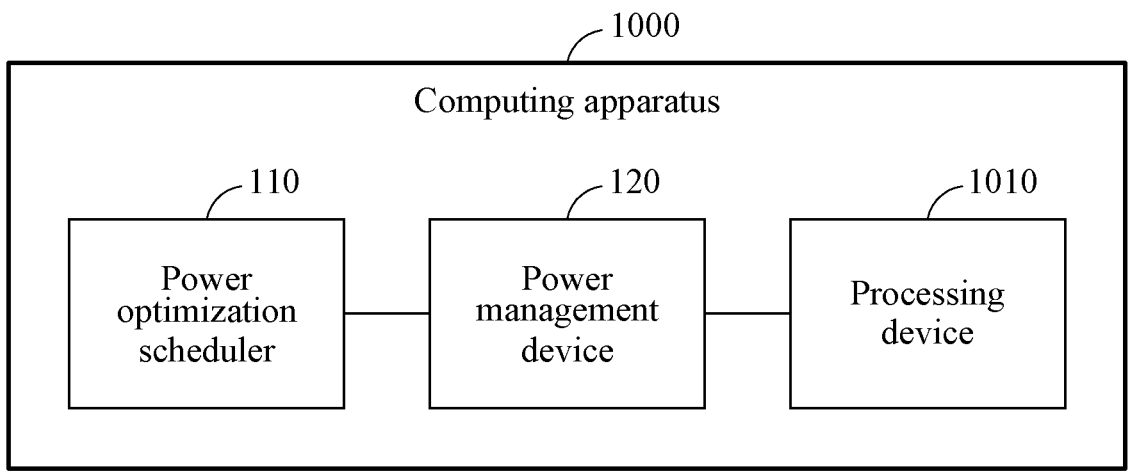
FIGS. 10, 11 and 12 are diagrams illustrating examples of computing apparatuses including power optimization schedulers.
Figure 11:
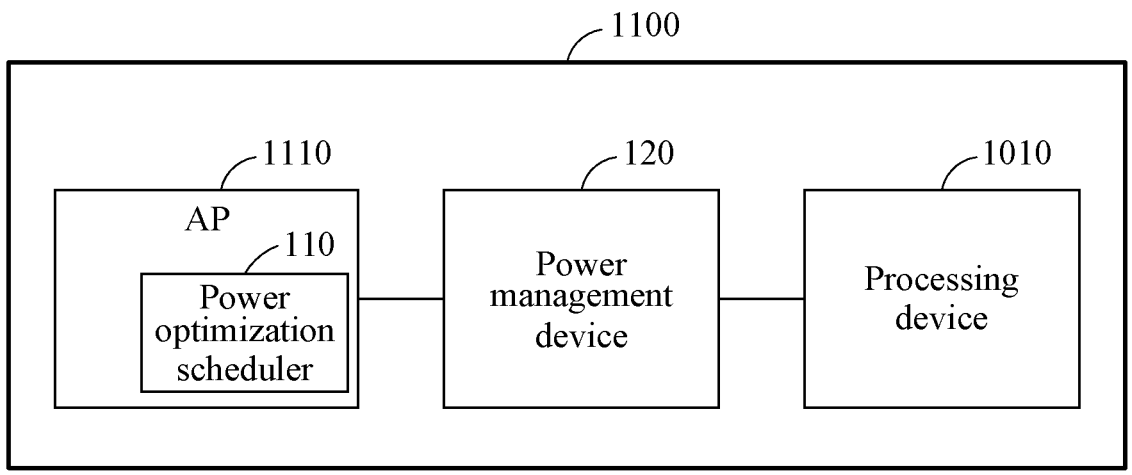
Figure 12:
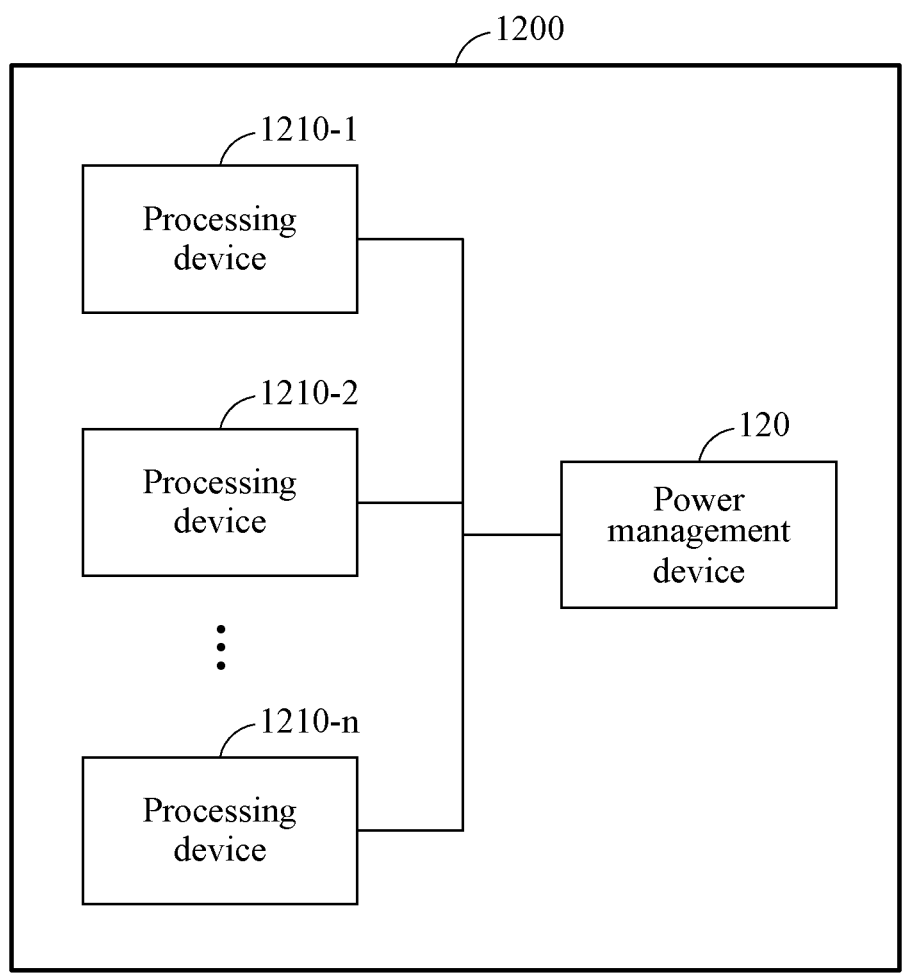

FIGS. 10, 11 and 12 are diagrams illustrating examples of computing apparatuses.

Computing apparatuses that will be described below with reference to FIGS. 10 through 12 may correspond to a fixed terminal (for example, a personal computer (PC)), a mobile terminal (for example, a smartphone or a tablet), or a server.

Computing apparatuses that will be described below with reference to FIGS. 10 through 12 may achieve an optimal power efficiency based on computation amounts for each operator, for each layer and for each NN model.

Referring to FIG. 10, a computing apparatus 1000 includes a power optimization scheduler 110, a power management device 120 and a processing device 1010.

The power optimization scheduler 110 determines a voltage value for a task to be performed by the processing device 1010 and controls the power management device 120 based on the determined voltage value.

The power management device 120 applies a voltage corresponding to the determined voltage value to the processing device 1010.

In the example of FIG. 10, the power optimization scheduler 110 may be implemented as software. However, examples are not limited thereto, and the power optimization scheduler 110 may be implemented as a hardware-based processing device that is physically separated from the processing device 1010.

The processing device 1010 may include, but is not limited to, an NPU.

The processing device 1010 measures LVcc.

Although a single processing device 1010 is included as shown in FIG. 10, the computing apparatus 1000 may include a plurality of processing devices that are to perform a task.

In an example, a new NN model may be input to the computing apparatus 1000. In this example, the power optimization scheduler 110 may find a voltage for each frequency optimized for the new NN model using an LVcc measurement function of the processing device 1010 or using an external system.

In an example, to find a voltage for each frequency optimized for the new NN model, the power optimization scheduler 110 may perform a frequency sweep and a voltage sweep. In this example, during the frequency sweep and the voltage sweep, the power optimization scheduler 110 may find a point at which minimum power is consumed immediately before a failure occurs. Also, the power optimization scheduler 110 may measure a temperature during the frequency sweep and the voltage sweep, may determine whether a failure occurs based on the temperature, and may find an allowable temperature. In other words, when a failure occurs due to the frequency sweep and the voltage sweep, the power optimization scheduler 110 may determine a temperature measured immediately before the failure occurs as an allowable temperature. Also, the power optimization scheduler 110 may change the temperature, may determine whether a failure occurs based on the temperature, and may find a point at which minimum power is consumed immediately before the failure occurs.

In another example, to find a voltage for each frequency optimized for the new NN model, the power optimization scheduler 110 may use a support vector machine (SVM) or a regression of machine learning. In another example, to find a voltage for each frequency optimized for the new NN model, the power optimization scheduler 110 may use a deep neural network (DNN) or reinforcement learning.

In another example, to find a voltage for each frequency optimized for the new NN model, the power optimization scheduler 110 may find a point with a smallest power consumption based on a voltage and a frequency for a maximum performance of the processing device 1010.

In another example, when a voltage and a frequency of a memory are different from a voltage and a frequency of an operator (or a core), the power optimization scheduler 110 may individually change the voltage and the frequency of the memory and the voltage and the frequency of the operator (or the core), and may find a "voltage for each frequency" in which the optimal power consumption and maximum performance may be achieved, based on a result of the change.

When a voltage for each frequency optimized for the new NN model is determined, the power optimization scheduler 110 may add a voltage value for each frequency for the new NN model to the table 210 of FIG. 2.

Depending on an implementation, a new operator may be added to an existing NN model. The power optimization scheduler 110 may also find a voltage for each frequency optimized for the new operator based on the above-described scheme. Also, the power optimization scheduler 110 may record a voltage for each frequency optimized for the new operator in the table 410 of FIG. 4.

Referring to FIGS. 11, a computing apparatus 1100 includes an application processor (AP) 1110, a power management device 120 and a processing device 1010.

A power optimization scheduler 110 may be included in the AP 1110. In other words, the AP 1110 may implement the power optimization scheduler 110.

Referring to FIG. 12, a computing apparatus 1200 includes a plurality of processing devices 1210-1 through 1210-n, and a power management device 120. Each of the processing devices 1210-1 through 1210-n may include, but is not limited to, an NPU.

In the example of FIG. 12, one of the plurality of processing devices 1210-1 through 1210-n may include or implement a power optimization scheduler 110. For example, the processing device 1210-1 may include or implement the power optimization scheduler 110, to determine a voltage value for a task to be performed by the other processing devices, for example, the processing devices 1210-2 through 1210-n, and to control the power management device 120 based on the determined voltage value. The power management device 120 may apply a voltage corresponding to the determined voltage value to the processing devices 1210-2 through 1210-n.

Although not shown in FIGS. 10 through 12, the computing apparatuses 1000, 1100, and 1200 may further include any one or any combination of an input device, an output device, and a communication device.

The input device may receive a user input from a user. The input device may detect an input from, for example, a keyboard, a mouse, a touch screen, a microphone, or a user, and may include any other device configured to transfer the detected input.

The output device may provide an output to a user through a visual scheme, an auditory scheme, or a tactile scheme. The output device may include, for example, a display, a speaker, a vibration generator, or other devices configured to provide the output to the user.

The communication device may communicate with an external device via a wired or wireless network. For example, the communication device may communicate with an external device using a wired communication scheme, or a wireless communication scheme, for example, Bluetooth, wireless fidelity (Wi-Fi), a third-generation (3G) communication scheme, or a long term evolution (LTE) communication scheme.

The above description provided with reference to FIGS. 1 through 9 is also applicable to the examples of FIGS. 10 through 12, and accordingly further description is not repeated herein.

The apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an FPGA, a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of a power optimization scheduler. In another example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An operating method of a power optimization scheduler, the operating method comprising:
   obtaining information regarding a neural network (NN) model;
   determining a voltage value for a task to be performed by at least one processing device, based on the obtained information regarding the NN model; and
   controlling a power management device to apply a voltage corresponding to the determined voltage value to the at least one processing device,
   wherein the determining of the voltage value comprises determining, as the voltage value for the task, a voltage value matching a frequency used by the at least one processing device, and matching of the NN model to one of predetermined differentiating information about different neural networks, among predetermined voltage values of an operator corresponding to the task.

2. The operating method of claim 1, wherein the task comprises any one or any combination of the NN model, a layer of the NN model, and the operator used in the NN model.

3. The operating method of claim 1, wherein the determining of the voltage value comprises obtaining the voltage value from a table.

4. An operating method of a power optimization scheduler, the operating method comprising:
   obtaining information regarding a neural network (NN) model;
   determining a voltage value for a task to be performed by at least one processing device, based on the obtained information regarding the NN model; and
   controlling a power management device to apply a voltage corresponding to the determined voltage value to the at least one processing device,
   wherein the determining of the voltage value comprises determining, as the voltage value for the task, a voltage value matching a frequency used by the at least one processing device among predetermined voltage values of an operator corresponding to the task, and
   wherein the determining of the voltage value comprises listing a voltage value of each of operators used in the NN model based on an order of the operators.

5. The operating method of claim 1, wherein the determining of the voltage value comprises:
   calculating a first predicted power consumption value of the at least one processing device based on a type of the NN model, as the one predetermined differentiating information;
   calculating a second predicted power consumption value of the at least one processing device based on a voltage value corresponding to each of layers in the NN model;
   calculating a third predicted power consumption value of the at least one processing device based on a voltage value corresponding to each of operators used in the NN model; and
   determining the voltage value for a task based on a minimum value among the first predicted power consumption value through the third predicted power consumption value.

6. The operating method of claim 1, further comprising:
   adjusting at least one of a voltage and the frequency based on computation amounts respectively allocated to processing devices of the at least one processing device, in response to the processing devices being assigned to perform the task.

7. The operating method of claim 6, wherein the adjusting of the at least one of the voltage and the frequency comprises adjusting a voltage and a frequency of a processing device with a smallest computation amount among the computation amounts respectively allocated to the processing devices to be less than voltages and frequencies of other processing devices.

8. The operating method of claim 1, further comprising:
   calculating computation amounts that are to be respectively allocated to processing devices of the at least one processing device based on at least one of a weight matrix of the NN model and an input feature map corresponding to an input vector, in response to the processing devices being assigned to perform the task; and
   adjusting at least one of a voltage and the frequency based on the computation amounts to be respectively allocated to the processing devices.

9. The operating method of claim 8, wherein the calculating of the computation amounts comprises:
   analyzing at least one of a position and a ratio of a first value in the weight matrix and at least one of the position and the ratio of the first value in the input feature map; and
   calculating the computation amounts to be respectively allocated to the processing devices, based on a result of the analyzing.

10. The operating method of claim 1, further comprising:
    adding a margin to the voltage value based on a number of times the task is performed.

11. The operating method of claim 10, further comprising:
    changing the margin, in response to the number of times the task being performed exceeding a threshold.

12. The operating method of claim 1, further comprising:
    performing a frequency sweep and a voltage sweep, in response to an additional NN model being input; and
    determining a voltage value for each frequency with respect to the input additional NN model based on a result of the performing.

13. A computing apparatus comprising:
    at least one processing device; and
    a power optimization scheduler configured to obtain information regarding a neural network (NN) model, to determine a voltage value for a task to be performed by the at least one processing device, based on the obtained information regarding the NN model, and to control a power management device to apply a voltage corresponding to the determined voltage value to the at least one processing device, wherein the power optimization scheduler is further configured to determine, as the voltage value for the task, a voltage value matching a frequency used by the at least one processing device, and matching of the NN model to one of predetermined differentiating information about different neural networks, among predetermined voltage values of an operator corresponding to the task.

14. The computing apparatus of claim 13, wherein the task comprises any one or any combination of the NN model, a layer of the NN model and the operator used in the NN model.

15. The computing apparatus of claim 13, wherein the power optimization scheduler is further configured to obtain the voltage value from a table.

16. The computing apparatus of claim 13, wherein the power optimization scheduler is further configured to list a voltage value of each of operators used in the NN model based on an order of the operators.

17. The computing apparatus of claim 13, wherein the power optimization scheduler is further configured to:

calculate a first predicted power consumption value of the at least one processing device based on a type of the NN model, as the one predetermined differentiating information;

calculate a second predicted power consumption value of the at least one processing device based on a voltage value corresponding to each of layers in the NN model;

calculate a third predicted power consumption value of the at least one processing device based on a voltage value corresponding to each of operators used in the NN model; and determine the voltage value for the task based on a minimum value among the first predicted power consumption value through the third predicted power consumption value.

18. The computing apparatus of claim 13, wherein the power optimization scheduler is further configured to adjust at least one of a voltage and the frequency based on computation amounts respectively allocated to the processing devices of the at least one processing device, in response to the processing devices being assigned to perform the task.

19. The computing apparatus of claim 13, wherein the power optimization scheduler is further configured to:

calculate computation amounts that are to be respectively allocated to processing devices of the at least one processing device based on at least one of a weight matrix of the NN model and an input feature map corresponding to an input vector, in response to the processing devices being assigned to perform the task; and adjust at least one of a voltage and the frequency based on the computation amounts to be respectively allocated to the processing devices.

20. The computing apparatus of claim 19, wherein the power optimization scheduler is further configured to:

analyze at least one of a position and a ratio of a first value in the weight matrix and at least one of the position and the ratio of the first value in the input feature map; and calculate the computation amounts to be respectively allocated to the processing devices, based on a result of the analyzing.

* * * * *